May 11, 1926.
C. J. ALEXANDER ET AL
1,584,067
APPARATUS FOR CONVEYING CANNED GOODS INTO AND FROM A COOKING VESSEL
Filed Feb. 4, 1924    2 Sheets-Sheet 1
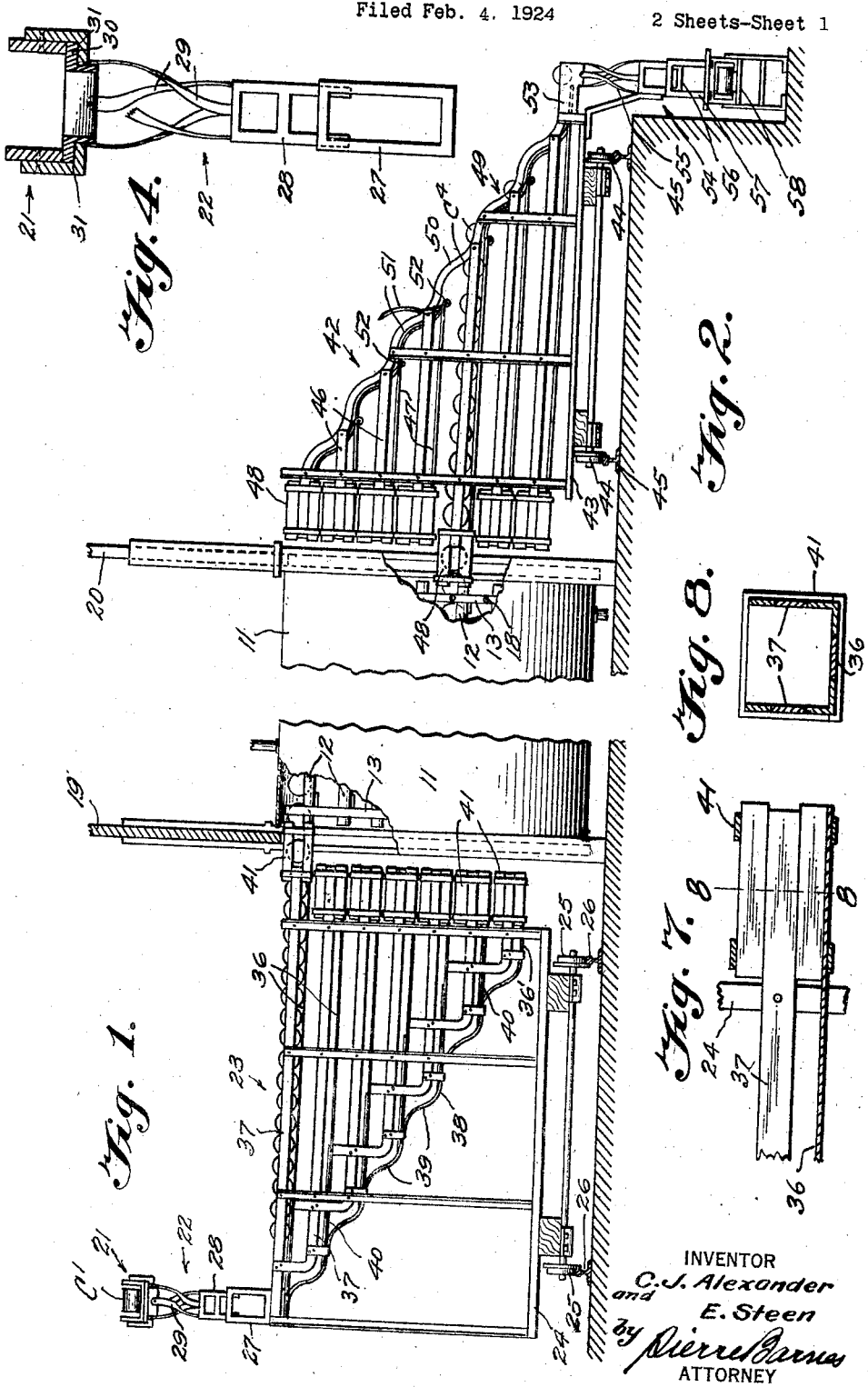
INVENTOR
C. J. Alexander
and E. Steen
ATTORNEY

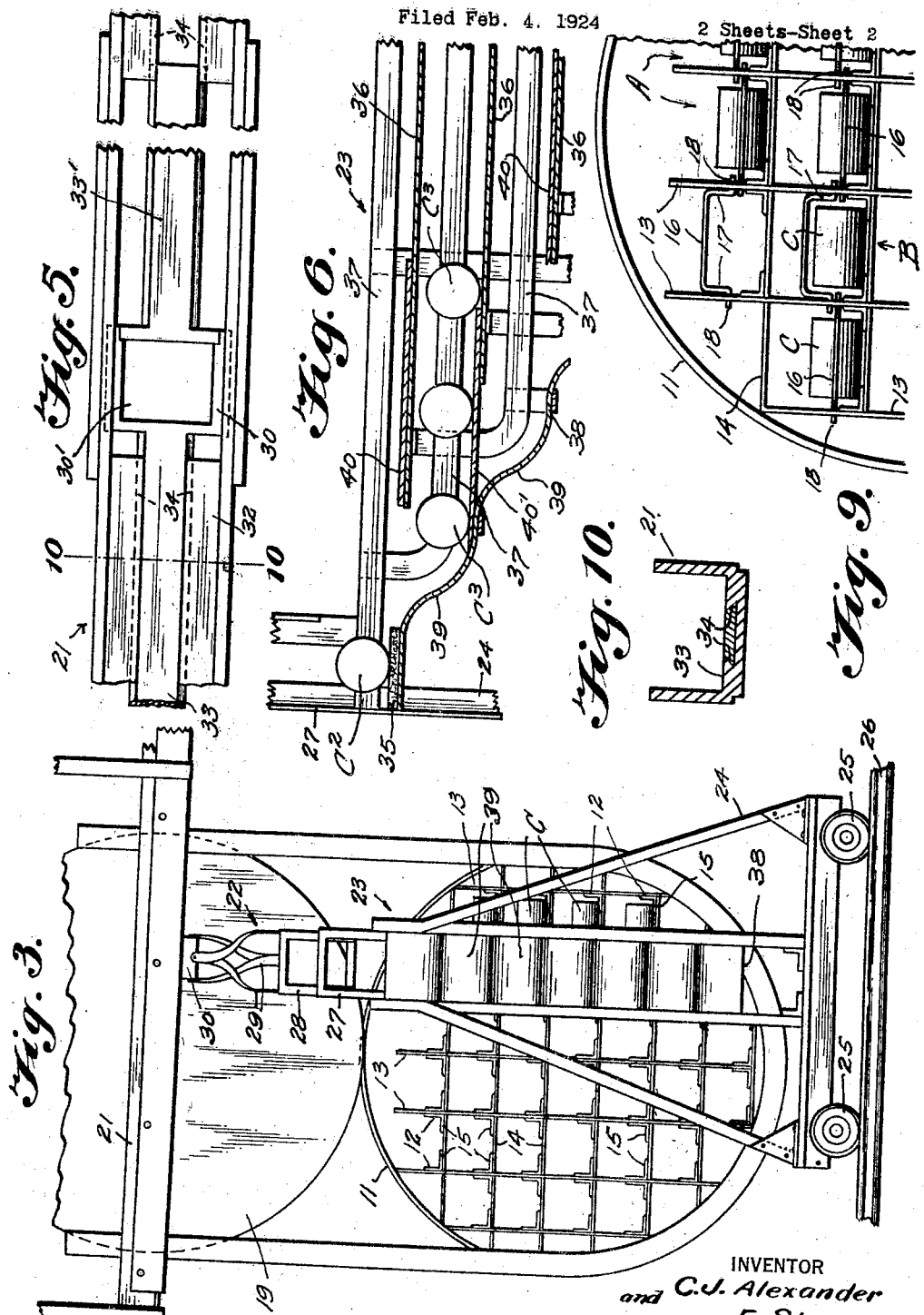

Patented May 11, 1926.

1,584,067

UNITED STATES PATENT OFFICE.

CLARENCE J. ALEXANDER, OF SEATTLE, WASHINGTON, AND EMIL STEEN, OF WEST BERKELEY, CALIFORNIA.

APPARATUS FOR CONVEYING CANNED GOODS INTO AND FROM A COOKING VESSEL.

Application filed February 4, 1924. Serial No. 690,480.

Our invention relates to apparatus for feeding and discharging canned goods to and from a cooking vessel.

The object of the invention is the perfecting of devices of this character.

More specific objects and advantages of the invention will appear in the following specification.

The invention is illustrated in the accompanying drawings, wherein,—

Figure 1 is a view partly in side elevation and partly in vertical section showing the receiving end of a cooking vessel and the appliances for feeding canned goods into the same. Fig. 2 is a side elevation of the delivery end of the cooking vessel, partly broken away and of the can discharging appliances. Fig. 3 is an end elevation of Fig. 1. Fig. 4 is a transverse sectional view of the conveyor trough shown in Figs. 1 and 3, and the slidable chute thereof for depositing cans from said trough onto the feed carriage. Fig. 5 is a fragmentary plan view of the conveyor trough chute. Fig. 6 is a fragmentary longitudinal vertical section of feed carriage. Fig. 7 is a vertical longitudinal section detail view of a bridge element such as employed on the feed and delivery carriages. Fig. 8 is a transverse section on line 8—8 of Fig. 7. Fig. 9 is a rear end view of a portion of the cooking vessel. Fig. 10 is a detail sectional view on line 10—10 of Fig. 5.

In said drawings, the reference numeral 11 represents a vessel, conventionally known as a "retort" in which canned goods are cooked by the agency of steam. Provided within said retort is a rack comprising longitudinally disposed angle bars 12 which are held in place as by means of vertical bars 13 and horizontal transverse bars 14 to provide channels for rows of cans such as C which are supported upon the flange elements 15 of complementary angle bars.

The rack angle bars 12 are inclined downwardly from the receiving end of the retort, shown in Fig. 1, to the delivery end, Fig. 2, to enable the cans to roll by gravity through the chamber of the retort.

To prevent the cans being accidentally discharged from the respective rack channels, we provide at the delivery ends thereof stops, such as shown in Fig. 9, each stop consisting of a wire 16 formed to a substantially U-shape having side arms 17 terminating in axially aligned fingers 18 which are journaled in holes provided in the adjacent rack bar 13. When the stops are in horizontal position as illustrated in rows A in Fig. 9, they serve to prevent the passage of the cans from the respective channels, but when the stops are upwardly turned into vertical positions, as shown in rows B, the cans are permitted to pass the stops.

Doors 19 and 20 are provided for the inlet and outlet ends respectively of the retort.

Adjacent to the inlet end of the retort and disposed at right angles to the retort axis is an elevated inclined trough 21 whereby cans, as $C^1$, containing food are conveyed as by rolling from a source of supply to be deposited through the medium of a chute 22 into a feed carriage 23 whence the cans are delivered into said retort.

This carriage comprises a frame 24 mounted upon car wheels 25 which travel on track rails 26 disposed transversely of the retort, as shown in Figs. 1 and 3.

Secured upon said carriage frame at its end most remote from the retort is a rectangular shaped receiver 27 in which is fitted for vertical movements the rectangular shaped lower chute element 28 which is suspended by twisted rods 29 from an apertured head piece 30 which is slidable longitudinally of the trough in guide ways 31 provided in the latter.

To accommodate the travel of the chute the trough is unprovided with a floor opposite the retort, and to afford a bridge for conducting the cans from the floor parts 32 to and from the chute, the head piece 30 is provided with aligned tongues 33 and $33^1$ which are adapted to slide in guide ways 34 of the respective floor parts. The cans rolling down the trough travel over the tongue 33 to enter the aperture $30^1$ of the head piece of the chute and in falling through the same the cans are by means of rods 29 turned ninety degrees about a vertical axis before being deposited upon a cushion 35, Fig. 6, provided upon said carriage.

The carriage 23 is provided with a series of inclined conduits disposed, one above the other, said conduits comprising floor elements 36 and side wall elements 37.

The lowermost $36^1$ of said floors is coextensive with the lower end of a stepped lead 38 having sloping riser elements 39. The other of said floor elements have their outer ends, with respect to the retort, terminate at distances from said lead sufficient to permit the passage of the cans successively downward from floor to floor. To direct the cans onto any of the floors selectively there is provided for each a gate plate such as 40 (Fig. 6) which constitutes, in effect, an extension of the associated floor, and may be slidably moved into position to close or uncover as desired the passages referred to. This will be understood from an inspection of Fig. 6 wherein the gate 40 for the upper floor is illustrated in its retracted position to enable the cans such as $C^2$ deposited upon the cushion 35 to pass by such upper floor thence rolling down the adjacent riser 39 and landing upon the gate as $40^1$ of the second floor whereby the cans as $C^3$ are caused to roll upon such second floor.

The lower ends of the carriage floors are in alignment with the flange or track elements 15 of the retort rack-channels and are operatively connected thereto by means of bridge members 41 which are slidably connected with the floor and side elements 36 and 37 of the carriage conduits as best shown in Figs. 7 and 8.

At the discharge end of the retort 11 is provided a second carriage, indicated generally by 42, having a frame 43 mounted upon car wheels 44 arranged to travel on track rails 45 disposed at right angles to the retort.

This carriage 42 is also provided with a series of superposed inclined conduits, one for each channel of a vertical row thereof in the retort. Said conduits comprising side wall elements 46 and floor elements 47 which are arranged to be connected by means of bridge members 48 with the respective retort channels. In the carriage end most distant from the retort is a stepped lead 49 comprising side walls 50 and door elements 51 for the respective conduits. These door elements are hinged as at 52 to swing upwardly for the delivery of cans such as $C^4$, Fig. 2. from a conduit, the cans thus delivered through a doorway roll downwardly upon the closed doors therebelow into a spout 53 from which depends a chute 54. This chute consists of twisted rods 55 which function to turn the cans horizontally into a chute member 56 which is slidably connected for relative vertical movements with a receiver 57 which is slidably mounted upon the side walls of a trough 58 arranged at right angles to the retort axis.

While we have illustrated our improved loading and discharging apparatus applied to a single retort it is to be understood that the present system is most advantageously employed with a plurality of retorts disposed in side-by-side relations. With such use the conveyor troughs 21 and 58 and the track rails 26 and 45 extend across the fronts and backs, respectively, of all of the retorts to enable a single feed-carriage 42 to serve for all of the retorts.

In operation the cans are fed by gravity from the conveyor trough 21 to the retort through the medium of the conduits of the carriage 23 when the latter is shifted laterally to present the conduits thereof in register with the channels of the retort. The cans roll through the retort in the respective channels and are retained therein by means of the stops 16 during the cooking operation.

After the contents of the cans have been sufficiently cooked the cans are permitted to roll from the retort onto the various conduits of the discharge carriage 42 from which, in turn, the cans roll into the delivery trough 58. In such operation the carriage 42 is shifted laterally to receive the cans from successive vertical rows of channels.

What we claim, is,—

1. In apparatus of the character described, a feed carriage having in combination a plurality of inclined conduits one above the other, a sloping lead disposed in spaced relation from the upper ends of the floors of the respective conduits to afford passages therebetween, a can-receiver provided above the floor of the upper conduit, and gate devices for closing the passages and positively directing the cans from said lead onto the floors of the respective conduits selectively.

2. In apparatus of the character described, a cooking vessel open at both ends and containing series of channels arranged in vertical and horizontal rows, a carriage provided in front of said vessel and arranged to travel transversely of the same, said carriage being provided with a series of inclined conduits one above the other, a lead formed to provide steps for the respective conduits, means to supply cans of goods upon the upper step of the lead and thence deliver the cans upon the successive steps therebelow, and means to deliver said cans from the respective steps onto the upper ends of the associated conduits selectively to enable the cans to roll into respective vertical rows of channels when the carriage is in different positions transversely of the vessel.

3. In apparatus of the character described, the combination with a cooking vessel provided interiorly with a plurality of inclined channels, a conveyor, a series of horizontally movable conduits for conducting canned goods to the respective channels, and an extensible chute for depositing the goods by gravitation from the conveyor onto the uppermost of said series of conduits.

4. In apparatus of the character described, the combination with a vessel having therein a series of inclined channels disposed one above the other, and a supply conveyor in front of the vessel, of a feed carriage having a series of inclined conduits, said conduits being spaced vertically to correspond with the vertical spacing of said channels, means to communicatively connect said conduits with the respective channels, a can delivery chute depending from said conveyor above the uppermost of the conduits thereof, said chute being separably connected to said carriage for movement therewith longitudinally of the conveyor, and means provided on the carriage for transferring cans from said chute into the conduits of the carriage for delivering the cans into selected channels of the vessel.

5. In apparatus of the character described, the combination with a vessel having therein a series of inclined channels disposed one above the other, and a supply conveyor in front of the vessel in substantially right angular relations thereto, of a feed carriage having a series of inclined conduits said conduits being spaced vertically to correspond with the vertical spacing of said channels, means to communicatively connect said conduits with the respective channels, a can delivery chute depending from said conveyor above the uppermost of the conduits thereof, said chute being separably connected to said carriage for movement therewith longitudinally of the conveyor, said chute including means for imparting horizontal turning movements to the cans during the passage of the same through said chute, and means provided on the carriage for transferring cans from said chute into the conduits of the carriage for delivering the cans into selected channels of the vessel.

6. In apparatus of the character described, the combination with a cooking vessel containing inclined channels disposed in vertical and horizontal rows, and a conveyor trough, of means for transferring cans of goods from said vessel to the conveyor trough, said means comprising a carriage arranged for travel in directions at right angles from the vessel, a plurality of inclined conduits provided on the carriage one above the other to receive cans from the respective channels of the different vertical rows thereof, and a lead element of the carriage connecting the lower ends of said conduits, said lead being provided with openings to afford ways for the delivery of cans from the respective conduits, and doors for the ways, said doors serving as track elements for cans delivered thereupon progressively from the successive conduits.

7. In apparatus as defined in claim 6 wherein the carriage is provided with a discharge chute adapted to impart a turn of approximately ninety degrees to each can delivered from the carriage.

CLARENCE J. ALEXANDER.
EMIL STEEN.